United States Patent
Rubin et al.

(10) Patent No.: US 9,882,275 B2
(45) Date of Patent: Jan. 30, 2018

(54) ANTENNAS FOR HANDHELD DEVICES

(71) Applicant: Essential Products, Inc., Palo Alto, CA (US)

(72) Inventors: Andrew E. Rubin, Los Altos, CA (US); Matthew Hershenson, Los Altos, CA (US); David John Evans, V, Palo Alto, CA (US); Xiaoyu Miao, Palo Alto, CA (US); Xinrui Jiang, San Jose, CA (US); Joseph Anthony Tate, San Jose, CA (US); Jason Sean Gagne-Keats, Cupertino, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/336,686

(22) Filed: Oct. 27, 2016

(65) Prior Publication Data
US 2017/0125897 A1 May 4, 2017

Related U.S. Application Data

(60) Provisional application No. 62/317,466, filed on Apr. 1, 2016, provisional application No. 62/300,631, filed
(Continued)

(51) Int. Cl.
*H01Q 1/24* (2006.01)
*H01Q 1/50* (2006.01)
(Continued)

(52) U.S. Cl.
CPC .......... *H01Q 1/50* (2013.01); *C23C 4/12* (2013.01); *C23C 24/04* (2013.01); *H01Q 1/243* (2013.01);
(Continued)

(58) Field of Classification Search
None
See application file for complete search history.

(56) References Cited

U.S. PATENT DOCUMENTS

| 5,118,567 A | 6/1992 | Komiyama et al. |
| 5,456,779 A | 10/1995 | Sinha et al. |
| (Continued) | | |

FOREIGN PATENT DOCUMENTS

| WO | 2010011009 A1 | 1/2010 |
| WO | 2016190737 A2 | 12/2016 |

OTHER PUBLICATIONS

MetalMembranes.com B.V., "Method to produce electrically isolated or insulated areas in a metal, and a product comprising such area", Priority document for application PCT/NL2016/050372, 8 pages.
(Continued)

*Primary Examiner* — Trinh Dinh
(74) *Attorney, Agent, or Firm* — Perkins Coie LLP

(57) ABSTRACT

A handheld device can include an encasing, one or more appurtenances associated with the encasing, communications circuitry contained within the encasing, and antenna elements. The antenna elements can be electrically coupled to the communications circuitry and integrated with the encasing and the one or more appurtenances. The appurtenances can include any of a touch-sensitive display screen, a button, a joystick, a click wheel, a scrolling wheel, a touchpad, a keypad, a keyboard, a microphone, a speaker, a camera, a sensor, a light-emitting diode, a data port, or a power port.

12 Claims, 15 Drawing Sheets

Related U.S. Application Data on Feb. 26, 2016, provisional application No. 62/249,130, filed on Oct. 30, 2015.

(51) Int. Cl.
*C23C 4/12* (2016.01)
*C23C 24/04* (2006.01)
*H04M 1/02* (2006.01)
*H01Q 21/28* (2006.01)

(52) U.S. Cl.
CPC ............ *H01Q 21/28* (2013.01); *H04M 1/026* (2013.01); *H04M 1/0264* (2013.01)

(56) References Cited

U.S. PATENT DOCUMENTS

| | | | |
|---|---|---|---|
| 7,078,613 B2 | 7/2006 | Spivack et al. | |
| 7,921,553 B2* | 4/2011 | Wojack | G06Q 30/0214 29/832 |
| 8,656,579 B2* | 2/2014 | Wojack | H01Q 1/243 29/592.1 |
| 9,565,777 B1 | 2/2017 | Arvin et al. | |
| 2005/0032558 A1* | 2/2005 | Chen | H04M 1/23 455/575.1 |
| 2005/0101356 A1* | 5/2005 | Hutchison | H01H 13/70 455/566 |
| 2006/0001130 A1 | 1/2006 | Islam et al. | |
| 2007/0020926 A1 | 1/2007 | Kalvesten et al. | |
| 2010/0053002 A1 | 3/2010 | Wojack et al. | |
| 2012/0176278 A1* | 7/2012 | Merz | H01Q 1/243 343/702 |
| 2013/0222195 A1 | 8/2013 | Hill et al. | |
| 2013/0302103 A1 | 11/2013 | Sona et al. | |
| 2014/0106684 A1 | 4/2014 | Burns et al. | |
| 2014/0125528 A1* | 5/2014 | Tsai | H01Q 13/106 343/702 |
| 2014/0191910 A1 | 7/2014 | Chung et al. | |
| 2014/0320369 A1 | 10/2014 | Azenui et al. | |
| 2014/0361945 A1 | 12/2014 | Misra et al. | |
| 2015/0048979 A1* | 2/2015 | Asrani | H01Q 5/0093 343/702 |
| 2015/0167193 A1 | 6/2015 | Demers et al. | |
| 2016/0049720 A1* | 2/2016 | Hwang | H01Q 1/243 343/702 |
| 2017/0121840 A1 | 5/2017 | Evans, V et al. | |

OTHER PUBLICATIONS

International Search Report PCT/US16/59512 dated Mar. 17, 2017, 9 pages.
International Search Report and Written Opinion in PCT/US16/59519 dated Mar. 31, 2017, 11 pages.
International Search Report and Written Opinion in PCT/US16/59512 dated Mar. 17, 2017, 9 pages.
Non-Final Office Action dated Jun. 15, 2017 in U.S. Appl. No. 15/336,701 of Evans, D. et al., filed Oct. 27, 2016., 11 pages.
Restriction Requirement dated Mar. 9, 2017, for U.S. Appl. No. 15/336,701 of Evans, D. et al., filed Oct. 27, 2016.

* cited by examiner

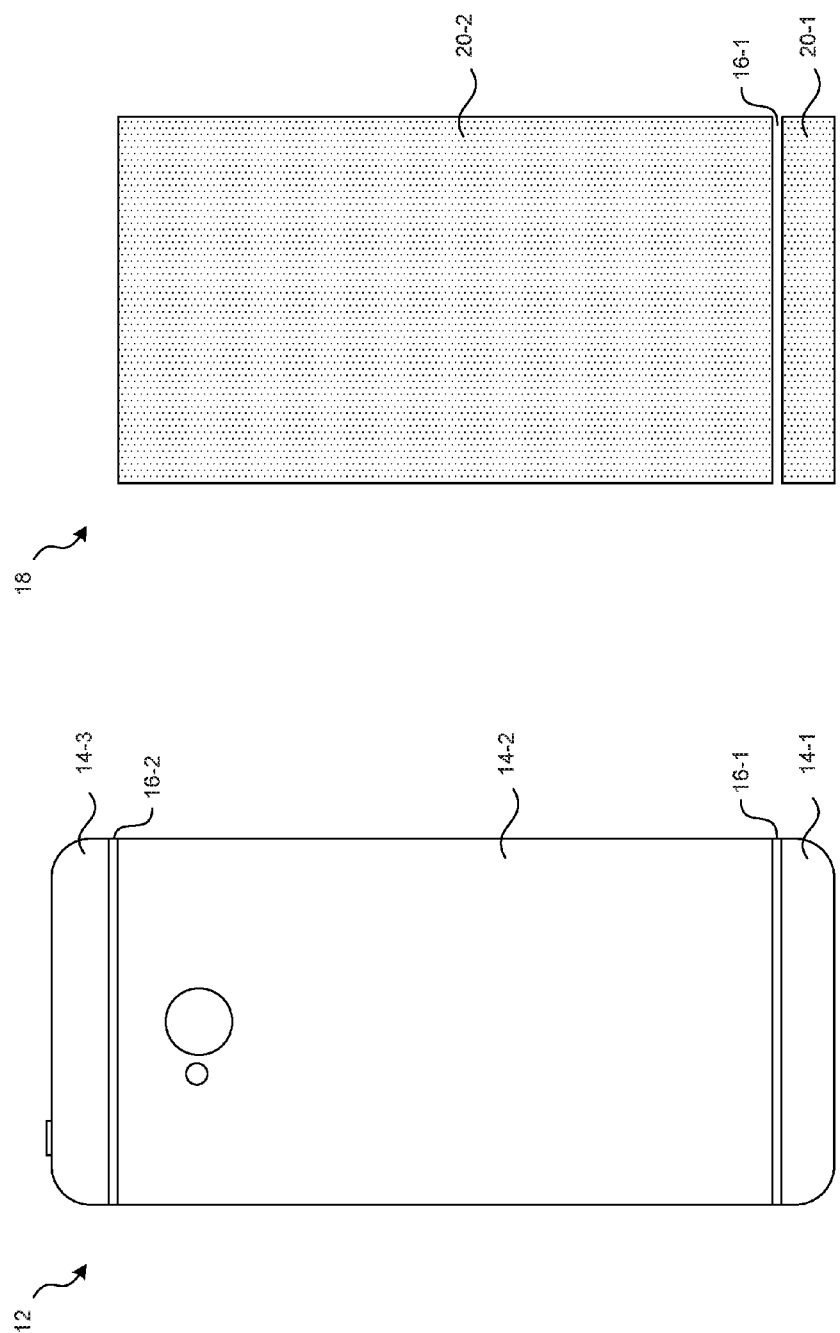

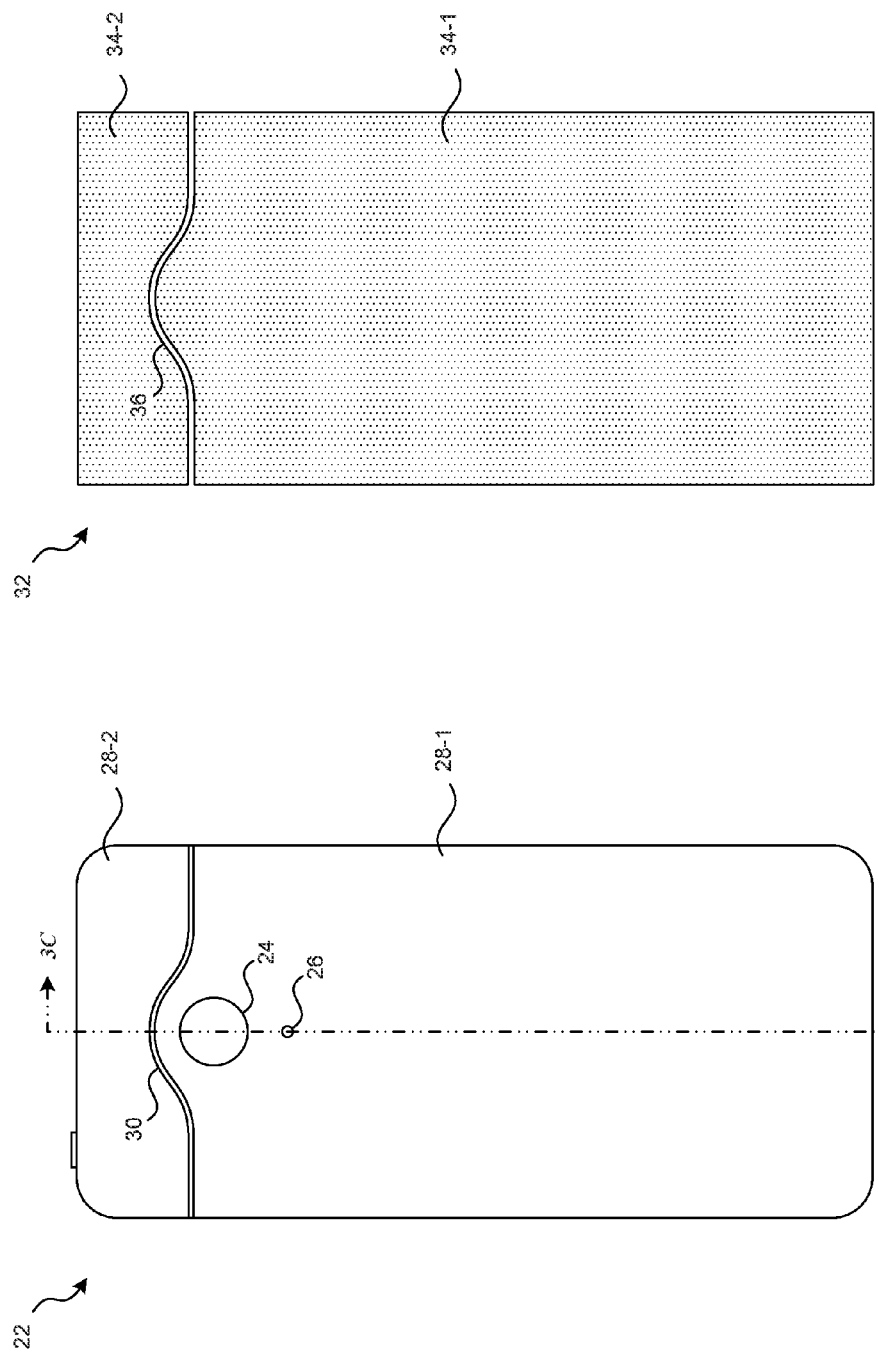

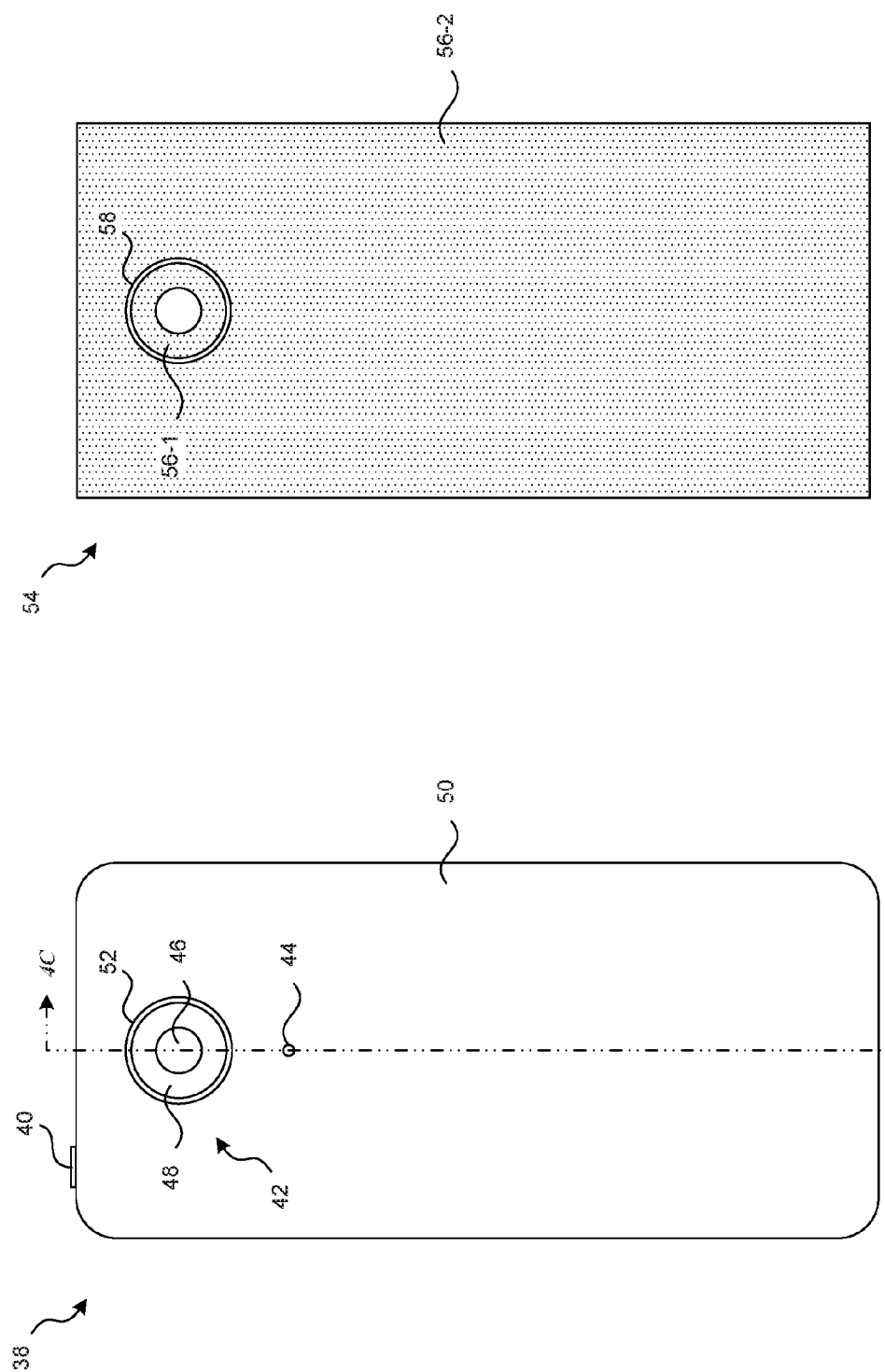

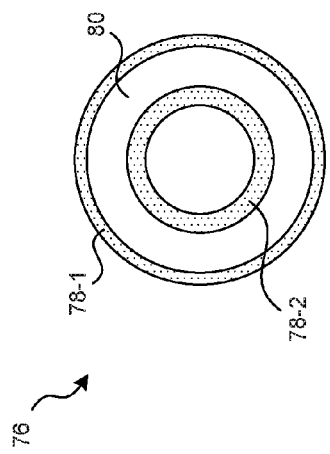
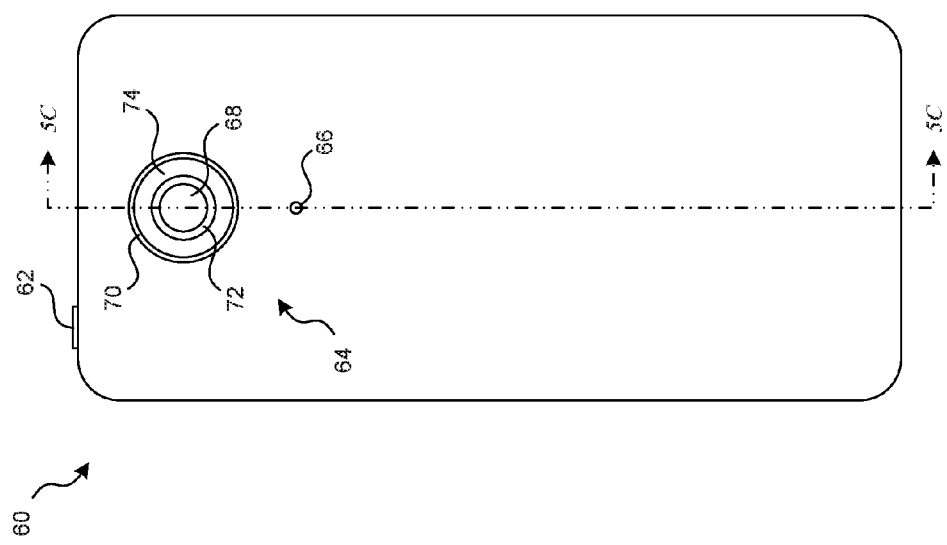

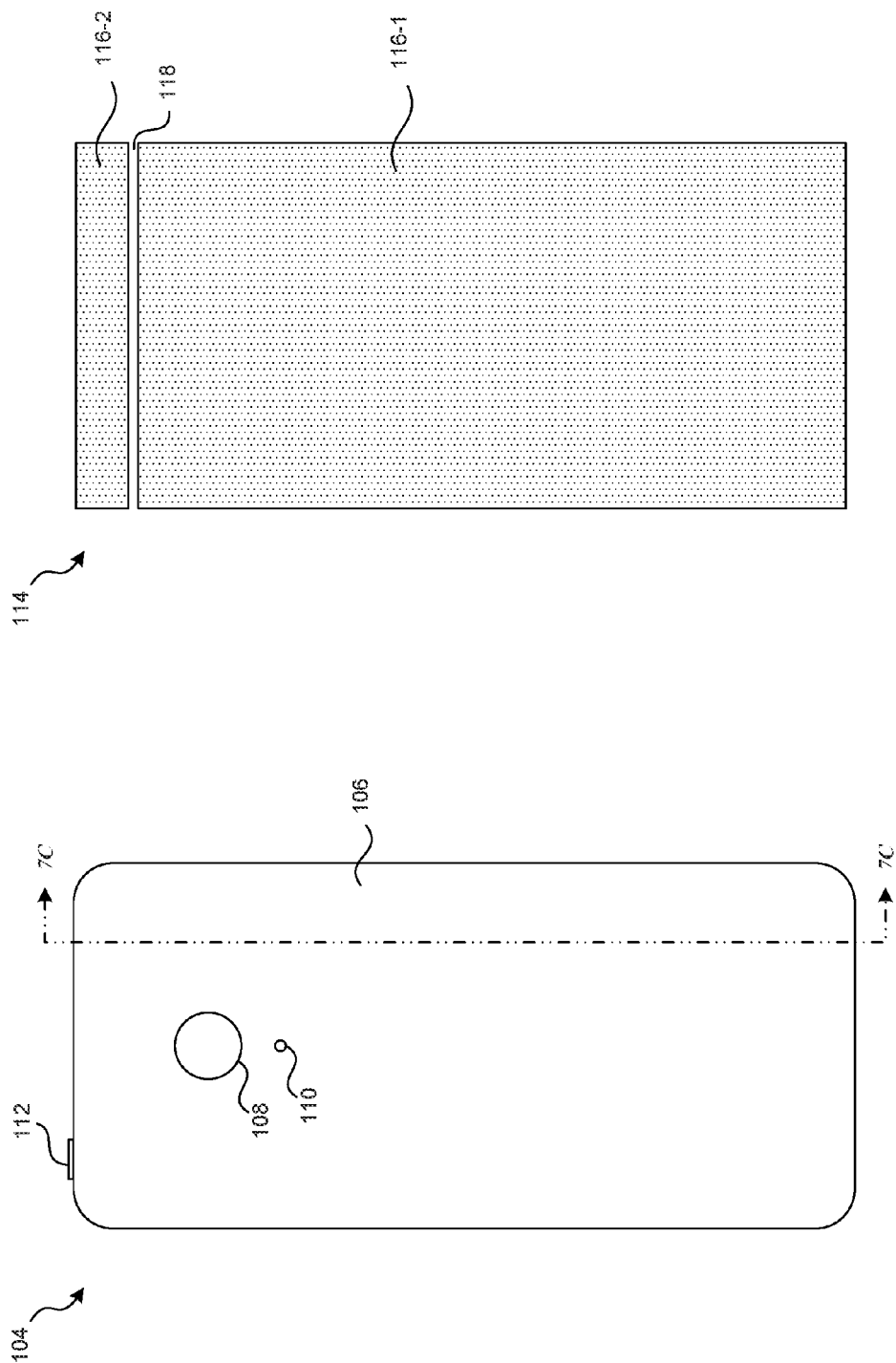

ANTENNAS FOR HANDHELD DEVICES

CROSS REFERENCE TO RELATED APPLICATIONS

This application claims priority to U.S. provisional patent application Ser. No. 62/317,466 filed Apr. 1, 2016, U.S. provisional patent application Ser. No. 62/249,130 filed Oct. 30, 2015, and U.S. provisional patent application Ser. No. 62/300,631 filed Feb. 26, 2016, which are all incorporated herein in their entireties by this reference.

TECHNICAL FIELD

The disclosed teachings relate to antennas. More particularly, the disclosed teachings relate to antennas for handheld devices.

BACKGROUND

Antennas for handheld devices (e.g., smartphones) are relatively complex structures. Modern antenna designs are limited by physical and functional constraints due to the small sizes of handheld devices and functional restrictions imposed by carriers and regulatory agencies. Moreover, a handheld device typically must accommodate numerous antennas, such as a primary cellular antenna, a diversity cellular antenna, a global positioning system (GPS) antenna, a Wi-Fi antenna, a near field communication (NFC) antenna, and the like.

For example, the primary antenna of a smartphone is typically the only cellular antenna that transmits signals. The primary antenna is designed to support specific frequencies, and comply with a limited specific absorption rate (SAR) of energy that can be absorbed by human tissue and a total radiated power (TRP) for every frequency band that the handheld device supports. These constraints, along with the type of antenna, and number of other antennas, typically dictate the location of an antenna on a handheld device. For example, the location of a primary antenna is usually at the lower end of a handheld device to comply with SAR limitations.

Dipole antennas are commonly used in smartphones. A dipole antenna has two conductive elements, such as metal wires or rods, that are usually bilaterally symmetrical. The dipole antenna is electrically coupled to communications circuitry such as transmitter and/or receiver circuitry. In operation, a driving current from the transmitter is applied or, for receiving antennas, an output signal to the receiver is taken, between the two conductive elements of the antenna.

A dipole antenna is physically about a half-wavelength long to provide reasonable efficiency and bandwidth. The overall size of the antenna is determined by the lowest frequency of operation because it has the longest wavelength. For example, supporting a low-band of around 810 MHz requires a handheld device to be about 7 inches long. As a result, an antenna may use an entire structure of a mobile phone, which is about 5 to 7 inches long.

FIG. 1 is a schematic diagram that shows the evolution of a simple dipole antenna into a typical dipole antenna for cellular phones. FIG. 1(a) shows a six-inch center fed dipole that includes two bilaterally symmetrical conductive elements 10-1 and 10-2. FIG. 1(b) shows a non-center fed dipole antenna with one fat arm 10-4. The fat arm 10-4 could make up the chassis for a mobile phone and function as a ground plane of the antenna to serve as a reflecting surface for radio waves. In FIG. 1(c), a top arm 10-5 is meandered to increase the length of the dipole antenna, and from there the antenna can evolve into an inverted-F antenna that is commonly used in wireless communications.

FIG. 2A shows an antenna formed by an encasing of a handheld device 12. As shown, the encasing is formed of three conductive elements 14-1, 14-2, and 14-3 separated by gaps 16-1 and 16-2 including non-conductive material. Examples of conductive material include aluminum and titanium. Examples of non-conductive material include various ceramics. FIG. 2B is a functional representation of the antenna 18 formed by the encasing of handheld device 12. The antenna 18 includes two antenna elements 20-1 and 20-2 corresponding to the physical conductive elements 14-1 and 14-2, respectively.

The gaps 16-1 and 16-2 that physically separate the conductive elements 14-1, 14-2, and 14-3 are commonly referred to as "antenna breaks." The separation formed by gap 16-1 enables the antenna 18 of handheld device 12 to radiate. This antenna design is difficult to implement because having that much metal on the backside of the handheld device 12 introduces parasitic capacitance that does not radiate. Moreover, the antenna breaks 16-1 and 16-2 are aesthetically unpleasing. Thus, current antenna designs for handheld devices have presented several challenges and are limited as a result of functional and physical constraints.

SUMMARY

Introduced here are at least one apparatus and one method. The at least one apparatus includes a handheld device having antenna elements integrated with an encasing and/or appurtenances of the handheld device. The at least one method is a method of integrating antenna elements separated by concealed antenna breaks into an encasing of the handheld device.

In some embodiments, a handheld device can include an encasing, one or more appurtenances associated with the encasing, communications circuitry contained within the encasing, and antenna elements. The antenna elements can be electrically coupled to the communications circuitry and integrated with the encasing and the one or more appurtenances. The appurtenances can include any of a touch-sensitive display screen, a button, a joystick, a click wheel, a scrolling wheel, a touchpad, a keypad, a keyboard, a microphone, a speaker, a camera, a sensor, a light-emitting diode, a data port, or a power port.

In some embodiments, a handheld device can include an encasing, communications circuitry contained within the encasing, and a display screen associated with the encasing. The display screen can include a light emitting panel, a transparent panel, and an antenna panel disposed between the light emitting panel and the transparent panel. The antenna panel can include at least one antenna element electrically coupled to the communications circuitry. The antenna element can be at least semitransparent to light emitted from the light emitting panel.

In some embodiments, methods of integrating antenna elements separated by concealed antenna breaks with an encasing include forming a continuous non-conductive coating on a conductive substrate. The continuous non-conductive coating has sufficient thickness and hardness to remain intact when gaps are etched in the conductive substrate to form separate conductive regions. The methods include etching the gaps in the conductive substrate to form the conductive regions on the continuous non-conductive coating. The methods further include backfilling the gaps with a non-conductive substance such that the conductive regions, the non-conductive substance separating the conductive regions, and the continuous non-conductive coating collectively form a continuous encasing.

Other aspects of the disclosed embodiments will be apparent from the accompanying figures and detailed description.

This Summary is provided to introduce a selection of concepts in a simplified form that are further described below in the Detailed Description. This Summary is not intended to identify key features or essential features of the embodied subject matter, nor is it intended to be used to limit the scope of the embodied subject matter.

BRIEF DESCRIPTION OF THE DRAWINGS

FIG. 2A shows an antenna formed by an encasing of a handheld device;

FIG. 2B is a functional representation of the antenna formed by the encasing of the handheld device of FIG. 2A;

FIG. 3A shows antenna elements separated by irregularly shaped antenna breaks that are collectively integrated with an encasing of a handheld device;

FIG. 3B is a functional representation of an antenna formed by the encasing of the handheld device of FIG. 3A;

FIG. 4A shows antenna elements integrated with both an encasing and an appurtenance of a handheld device;

FIG. 4B illustrates a functional representation of an antenna collectively formed by a combination of an encasing and an appurtenance of the handheld device;

FIG. 5A shows antenna elements integrated with an appurtenance of a handheld device;

FIG. 5B illustrates a functional representation of an antenna formed by the appurtenance of FIG. 5A;

FIG. 7A shows antenna elements separated by a concealed antenna break integrated with an encasing of a handheld device;

FIG. 7B is a functional representation of an antenna formed by the encasing of the handheld device of FIG. 7A;

DETAILED DESCRIPTION

Figure 1:
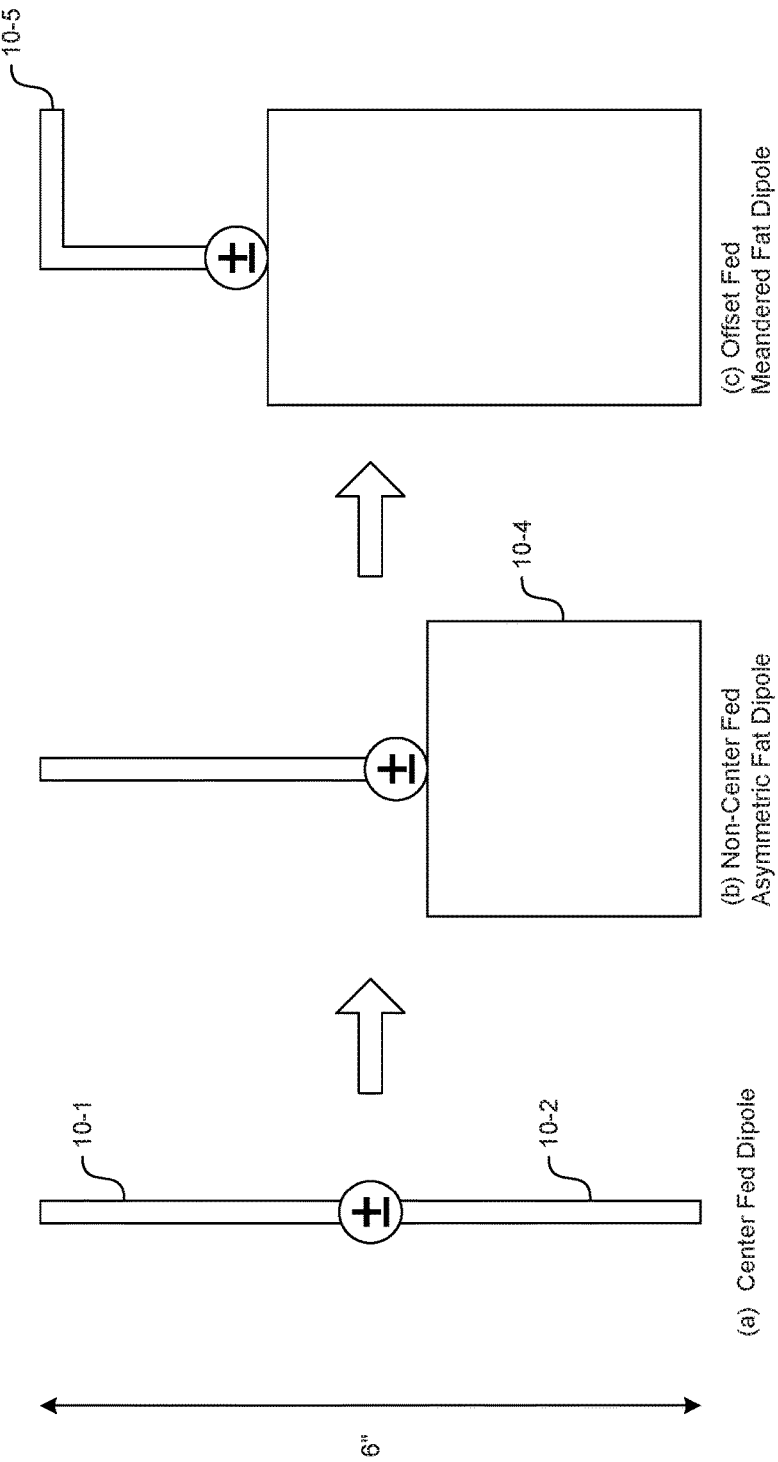
FIG. 1 is a schematic diagram that shows the evolution of a simple dipole antenna into a typical dipole antenna for cellular phones.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of terminology used here is only for describing embodiments and is not intended to limit the scope of the disclosure. Where context permits, words using the singular or plural form may also include the plural or singular form, respectively.

As used herein, the term "handheld device" refers to a small mobile computing device. Examples include a mobile phone, tablet computer, wearable computer, or the like.

As used herein, the term "integrating with" and variations thereof refer to structurally combining elements with one another.

As used herein, the term "antenna element" refers to a conductive element of an antenna that transmits or receives signals. For example, the conductive elements of a dipole antenna are antenna elements.

As used herein, the term "antenna break" refers to a gap or separation between antenna elements of an antenna. The antenna break is usually formed of non-conductive material.

As used herein, the term "communications circuitry" refers to the various electronics circuitry included in a handheld device that controls the operations of an antenna to, for example, transmit or receive signals such as radio frequency signals.

As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, refer to any connection or coupling, either direct or indirect, between two or more elements. The coupling or connection between the elements can be physical, logical, or a combination thereof.

Disclosed here is at least one handheld device integrating one or more antenna elements with components of the handheld device. The components include physical structures such as an encasing that forms an exterior surface of the handheld device and appurtenances of the handheld device that receive inputs or supply outputs. The antenna elements are formed of a conductive material suitable to radiate and receive radio signals. The antenna elements may be formed in a variety of shapes to accommodate integration into an encasing or appurtenances. Further, the antenna elements may be formed of a transparent or semitransparent material. Moreover, antenna breaks that separate the antenna elements may be concealed or irregularly shaped. As a result, an antenna is integrated with a combination of components of a handheld device to improve aesthetics and efficiently utilize existing physical structures.

Embodiments include a smartphone antenna that addresses the issue of efficient radiation while eliminating various compromises found in existing smartphones. In some embodiments, external components of a smartphone are used as antennas. For example, antenna elements can include any of a smartphone's side keys, camera bump/island, etc. In such embodiments, the camera bezel, volume key, and the like can be used, alone or in combination, as an antenna. Other embodiments include transparent antennas formed on a smartphone display screen, over the display screen itself, and under the display glass. In such embodiments, the display screen is an antenna radiator, for example, constituting a transparent conductor printed on the backside of the display screen. Embodiments also provide non-linear antenna breaks and/or variable-thickness antenna breaks.

FIG. 3A shows antenna elements separated by an irregularly shaped antenna break that are collectively integrated with an encasing of a handheld device. The encasing of the handheld device 22 houses electronics and circuitry, such as communication circuitry to process wireless communications. The encasing has a front that may include a display screen (not shown). The back of the encasing has a surface that includes a camera lens 24 of a backside camera disposed on a central vertical axis of the handheld device 22. The backside surface also includes a light source 26 that may indicate a status or provide a flash for the camera.

The back of the encasing is formed of conductive elements 28-1 and 28-2 separated by a gap 30 formed of non-conductive material. The conductive elements 28-1 and 28-2 may be formed of any conductive material such as aluminum or titanium. The gap 30 may be formed of any non-conductive material such as ceramic. The conductive elements 28-1 and 28-2 are electrically coupled to the communications circuitry housed within the encasing of the handheld device 22. As a result, the conductive elements 28-1 and 28-2 can act as antenna elements for wireless communications of the handheld device 22.

The gap 30 separating the conductive elements 28-1 and 28-2 is irregularly shaped. As used here, the term "irregularly shaped" and variants thereof refer to an elongated shape that is not continuously linear along a plane. For example, an irregularly shaped gap may be non-linear or have variable thickness along a plane, or a combination of both. As shown, the irregularly shaped gap 30 extends across the back of the encasing. The irregularly shaped gap 30 includes both linear and non-linear portions along the same plane. In particular, the irregularly shaped gap 30 includes a portion that curves with the camera lens 24 of the handheld device 22.

FIG. 3B is a functional representation of an antenna 32 formed by the encasing of the handheld device 22 of FIG. 3A. The antenna 32 is formed of antenna elements 34-1 and 34-2 separated by an irregularly shaped antenna break 36. The antenna elements 34-1 and 34-2 correspond to the conductive elements 28-1 and 28-2, and the irregularly shaped antenna break 36 corresponds to the irregularly shaped gap 30. As such, the antenna 32 is integrated with the encasing of the handheld device 22.

Figure 3C:
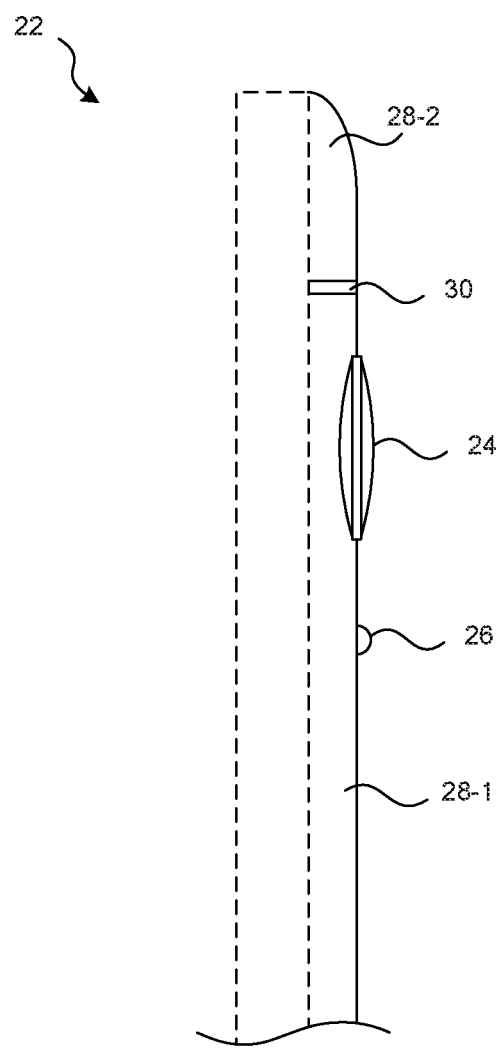
FIG. 3C shows a cutaway profile view of a portion of the handheld device of FIG. 3A.

FIG. 3C is a cutaway profile view of a portion of the handheld device 22 of FIG. 3A. As shown, the irregularly shaped gap 30 separates the backside encasing into the conductive elements 28-1 and 28-2. The bottom element includes the camera lens 24 and the light source 26.

Embodiments of a handheld device with irregularly shaped antenna breaks are not limited to that shown in FIGS. 3A through 3C. In some embodiments, any physical dimension of an antenna break may be irregular (e.g., non-uniform). For example, the width or thickness of an antenna break can vary along the length of the antenna break. As such, one or more antennas can be integrated with an encasing of a handheld device, while avoiding the need for regularly shaped external dividing antenna breaks to separate the antenna elements.

In some embodiments, antenna elements are integrated with appurtenances of a handheld device. As referred to herein, an appurtenance is a physical component associated with an encasing of a handheld device but may be structurally independent of the encasing. An appurtenance may control the handheld device, may be controlled by the handheld device, or both. For example, a user of a handheld device can supply input commands through an appurtenance, view output through an appurtenance, or both. In particular, a user can supply commands to control a handheld device by pressing a physical button located on the handheld device. Also, a light emitting diode (LED) of the handheld device may indicate a status of the handheld device. Other examples of appurtenances include display screens, joysticks, click wheels, scrolling wheels, touch pads, keyboards, microphones, speakers, cameras, sensors, other status indicators, data ports, power ports, and any other input or output devices.

An appurtenance may include conductive components and non-conductive components configured to perform customary functions of the appurtenance (e.g., receive input or provide output). For example, a wheel used for adjusting the volume of a mobile phone may be formed of aluminum and ceramic components. In some embodiments, an antenna element may be integrated with an appurtenance by utilizing these conductive or non-conductive components. For example, a conductive component of an appurtenance may be electrically coupled to communications circuitry contained in the mobile phone such that the conductive element of the appurtenance can act as an antenna element.

In some embodiments, an appurtenance may be specifically configured to include conductive or non-conductive materials that form antenna elements. For example, an appurtenance may be configured to include conductive material that acts as an active antenna element when electrically coupled to the communications circuitry contained in a handheld device. As a result, an appurtenance can function as an antenna element in addition to providing customary input or output functionality.

In some embodiments, antenna elements may be integrated with both appurtenances and an encasing of a handheld device. As such, different physical surfaces, structures, and combinations of both, could act as antenna elements when electrically coupled to communications circuitry contained in the handheld device to collectively form an antenna of the handheld device.

FIG. 4A shows antenna elements integrated with both an appurtenance and an encasing of a handheld device. A handheld device 38 includes appurtenances such as a physical button 40, a backside camera 42, and a light source 44. The backside camera 42 includes a lens 46 and a bezel 48 that holds the lens 46 in position on the back of the handheld device 38. The bezel 48 is formed of conductive material such as aluminum or titanium, and is electrically coupled to communications circuitry contained in the handheld device 38.

An encasing 50 of the handheld device 38 is also formed of conductive material such as aluminum or titanium, and is also electrically coupled to the communications circuitry contained in the handheld device 38. A ring 52 of non-conductive material is disposed between the bezel 48 and the encasing 50. As such, the ring 52 is irregularly shaped and separates the bezel 48 and the encasing 50 of the handheld device 38.

FIG. 4B illustrates a functional representation of an antenna 54 collectively formed by a combination of the encasing 50 and the bezel 48 of the handheld device 38. The antenna 54 is formed of antenna elements 56-1 and 56-2 separated by an irregularly shaped antenna break 58. The antenna elements 56-1 and 56-2 correspond to the bezel 48 and the encasing 50, respectively, and the irregularly shaped antenna break 58 corresponds to the ring 52. As such, the antenna 54 is integrated with both an appurtenance (the backside camera 42) and the encasing 50 of the handheld device 38.

Figure 4C:
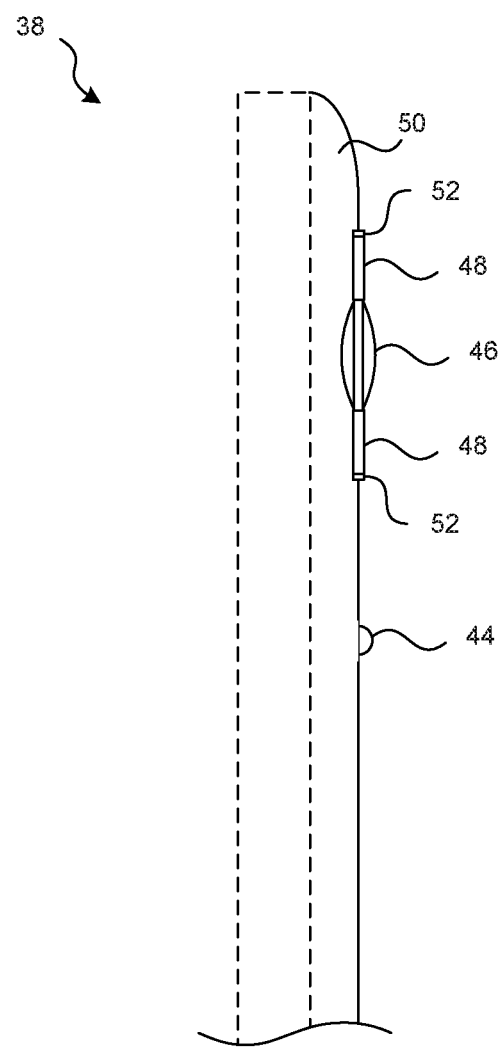
FIG. 4C is a cutaway profile view of a portion of the handheld device of FIG. 4A.

FIG. 4C is a cutaway profile view of a portion of the handheld device 38 of FIG. 4A. As shown, the bezel 48 abuts the lens 46 and can hold the lens 46 in place. The ring 52 (antenna break 58) separates the bezel 48 (antenna element 56-1) and the encasing 50 (antenna element 56-2) such that their combination can collectively act as the antenna 54 of the handheld device 38. Accordingly, antenna elements can be integrated with both an appurtenance and an encasing to better utilize existing physical structures of a handheld device.

FIG. 5A shows antenna elements integrated with an appurtenance of a handheld device. A handheld device 60 includes appurtenances such as a physical button 62, a backside camera 64, and a light source 66. The backside camera 64 includes a lens 68 and a bezel that holds the lens 68 in position on the back of the handheld device 60. The bezel includes three rings of material. An outermost ring 70 and an innermost ring 72 are formed of conductive material such as aluminum or titanium. A center ring 74 disposed between the outermost and innermost rings is formed of non-conductive material such as ceramic. The conductive rings 70 and 72 are electrically coupled to communications circuitry contained within the handheld device 60.

FIG. 5B illustrates a functional representation of an antenna 76 formed by the camera bezel of FIG. 5A. The antenna 76 includes ring-shaped antenna elements 78-1 and 78-2 that are separated by an irregularly shaped antenna break 80. The antenna elements 78-1 and 78-2 correspond to the outermost ring 70 and the innermost ring 72, respectively, and the irregularly shaped antenna break 80 corresponds to the center ring 74. As such, the antenna 76 is integrated with an appurtenance (the backside camera 64) of the handheld device 60.

Figure 5C:
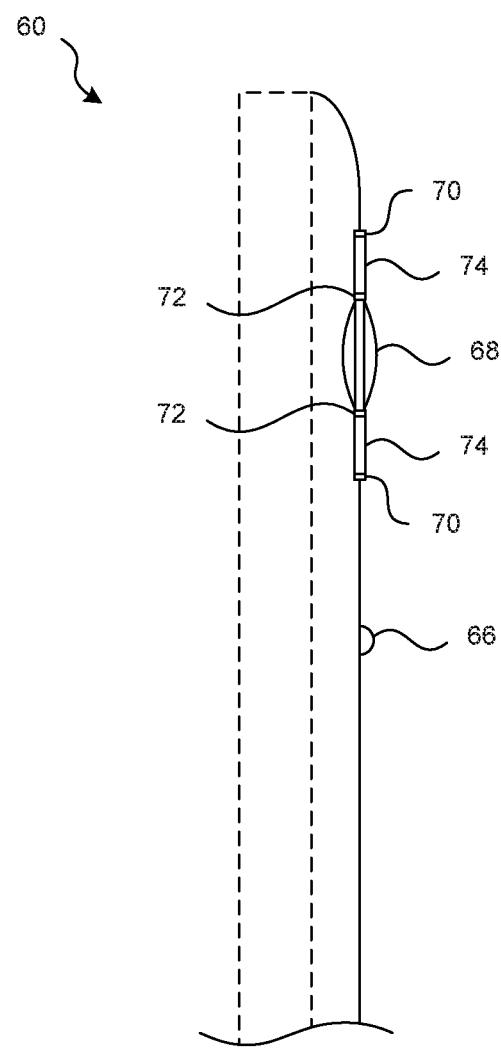
FIG. 5C is a cutaway profile view of a portion of the handheld device of FIG. 5A.

FIG. 5C is a cutaway profile view of a portion of the handheld device 60 of FIG. 5A. As shown, the lens 68 is held in position on the back of the handheld device 60 by the bezel including rings 70, 72, and 74. The center ring 74 (irregularly shaped antenna break 80) separates the outermost ring 70 (antenna element 78-1) and the innermost ring 72 (antenna element 78-2) such that their combination can collectively act as the antenna 76 of the handheld device 60. Accordingly, antenna elements can be integrated with an appurtenance to provide additional functionality.

In some embodiments, antenna elements are integrated with an appurtenance such as a display screen of a handheld device. For example, antenna elements may be integrated with a touch-sensitive display screen of a mobile phone. In contrast to other appurtenances, a display screen renders images as displayed output and may also operate to allow touch commands on the handheld device.

To avoid obscuring images rendered on the display screen, the antenna elements are formed of conductive material that is at least semitransparent to light emitted from the display screen, but preferably transparent to the emitted light. For example, the antenna elements could be formed of indium tin oxide (ITO) or other materials that have suitable conductive properties while remaining at least semitransparent to light emitted from the display screen.

Figure 6A:
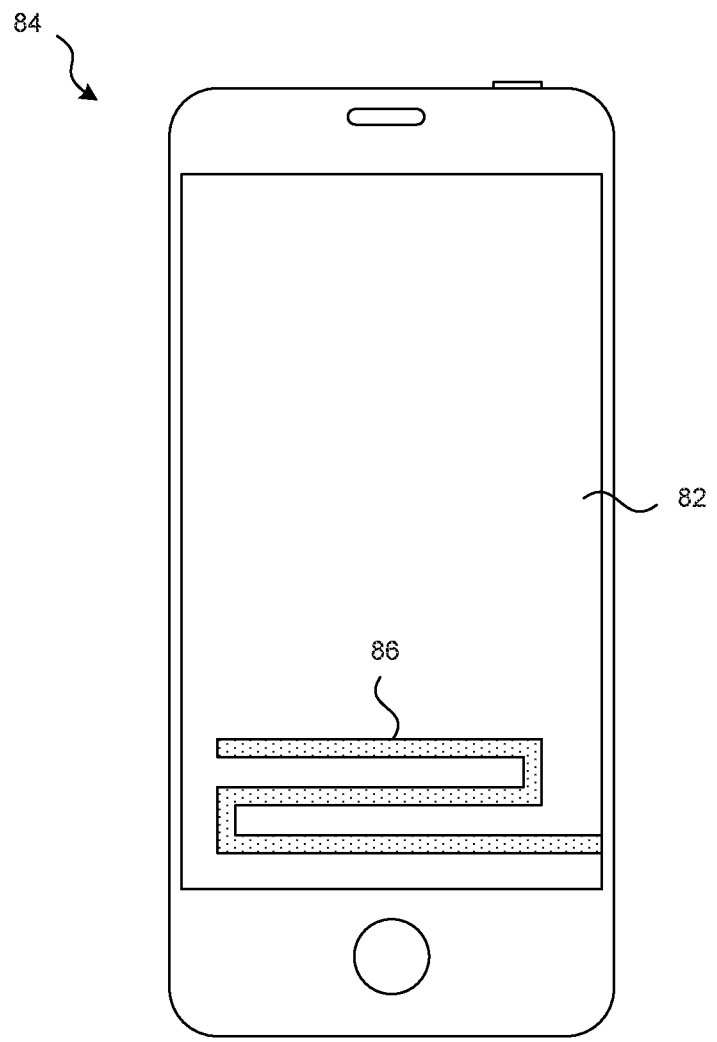
FIG. 6A shows an antenna element integrated with a display screen of a handheld device.

FIG. 6A shows an antenna element 86 integrated with a display screen 82 of a handheld device 84. The display screen 82 renders images and may accept input commands (e.g., touch inputs). An antenna element 86 is printed in the display screen 82 and, as such, overlays images rendered on the display screen 82. The antenna element 86 is at least semitransparent to light emitted from the display screen 82. As a result, the display screen 82 acts as an antenna yet the antenna element 86 is not visually perceptible by a user viewing images rendered on the display screen 82.

Figure 6C:
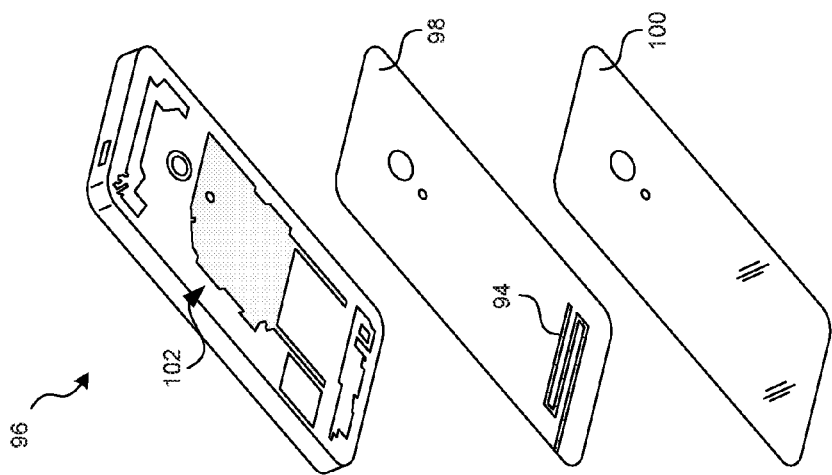
FIG. 6C shows layers of the backside of a handheld device that incorporates an antenna with the backside of the handheld device.
Figure 6B:
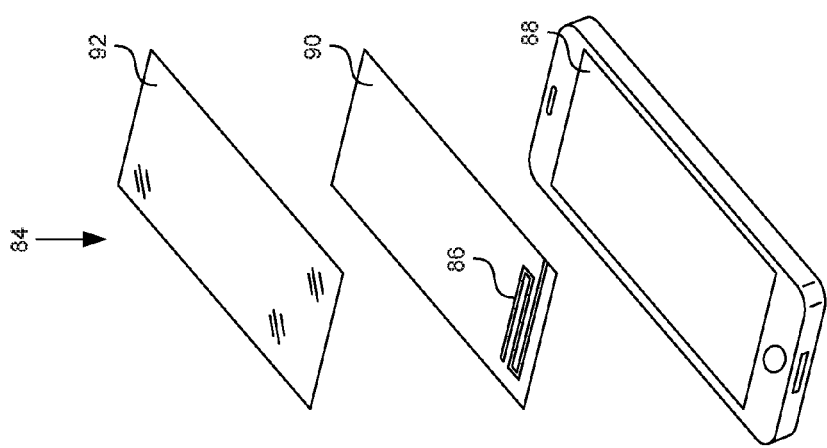
FIG. 6B shows layers of a display screen that incorporates an antenna with the display screen of the handheld device.

FIG. 6B shows layers of the display screen 82 of FIG. 6A integrated with the antenna element 86. The display screen 82 includes three panels (e.g., layers). A light emitting panel 88 includes electronics and circuitry to render images of the display screen. For example, the light emitting panel 88 may include a thin-film-transistor liquid-crystal display (TFT LCD). The antenna element 86 may be printed on an antenna panel 90, disposed between the light emitting panel 88 and a transparent panel 92. The transparent panel 92 may be formed of glass or any other suitable material (e.g., plastic) that is durable to protect the display screen 82 while being transparent to light emitted from the light emitting panel 88.

The antenna panel 90 may be a transparent substrate for the antenna element 86. The antenna panel 90 may be formed of glass, plastic, or other suitable non-conductive material. The antenna element 86 may be formed on the substrate by a variety of methods. For example, antenna elements could be sprayed, grown, or printed on the antenna panel 90 in accordance with various techniques known to persons skilled in the art, and described in greater detail further below with respect to other embodiments. The antenna element 86 is formed of conductive material that is at least semitransparent to light emitted from the light emitting panel 88. As such, the antenna element 86 does not obscure light emitted from the display screen 82.

The light emitting panel 88, antenna panel 90, and transparent panel 92 could be press-fit together and glued to form a front portion of the handheld device 84. The antenna element 86 is electrically coupled to communications circuitry of the handheld device 84 such that the display screen 82 acts as an antenna in addition to displaying rendered images and optionally receiving input commands.

The types, number, and combination of layers and antenna elements included in a display screen are not limited to that shown in FIG. 6B. In some embodiments, a display screen may include fewer layers. For example, antenna elements could be incorporated into the backside of a protective panel to avoid using a separate antenna panel. In some embodiments, a display screen may include a greater number of layers. For example, a touch-sensitive display screen may include a touch-sensitive panel disposed between the light emitting panel and the protective panel. The touch-sensitive panel may include conductive driving lines and sensing lines interweaved with insulating material that collectively act to detect touch inputs.

In some embodiments, conductive elements of a display screen that are configured to perform touch or image rendering functions can also act as antenna elements. For example, antenna elements can be integrated with a touch-sensitive panel configured to receive touch inputs, or integrated with a light emitting panel configured to render images.

Hence, existing conductive elements of a display screen can also act as antenna elements. For example, the driving lines and/or sensing lines of a touch-sensitive panel could have a dual function of providing a touch-sensitive interface and acting as antenna elements. Also, conductive elements configured to control pixels of a display screen configured to render images could also have a dual function to act as antenna elements. For example, capacitive coupling could be utilized to coordinate conductive components of the display screen to render images during some period of time and act as antenna elements during another period of time.

In some embodiments, the handheld device may automatically enable or disable the antenna elements integrated in the encasing and/or appurtenances at different times. For example, antenna elements integrated with a display screen of a mobile phone may be automatically disabled while a user of the mobile phone is conducting a call. During the call, antenna elements integrated in the encasing may remain or become enabled. In some embodiments, the antenna elements integrated in the display screen may only be enabled while the display screen is being used as an interface to provide inputs or receive outputs, or at all times other than when the mobile phone is used for conducting a call, or any combinations thereof in accordance with a multiplexing scheme or which could be set as modes of the handheld device.

Embodiments utilizing antenna elements that are at least semitransparent are not limited to display screens. FIG. 6C shows a semitransparent or transparent antenna element 94 integrated with an encasing of a handheld device 96. In particular, the encasing may include an antenna panel 98 and a glass panel 100 that forms an outer surface of handheld device 96. The antenna panel 98 is disposed under the glass panel 100, between enclosed electronics and circuitry 102 and the glass panel 100. The glass panel 100 may be decorative and/or functional to protect the enclosed electronics and circuitry 102 and/or accept inputs.

The antenna panel 98 may be the same or similar to the antenna panel 90 used in the display screen 84. The antenna element 94 included in the antenna panel 98 can be formed of conductive material that is at least semitransparent to visible light. As such, the antenna element 94 is not visibly perceptible to a user of the handheld device 96. In some embodiments, the antenna element 94 may be integrated directly in the glass panel 100 to avoid requiring the separate antenna panel 98. The antenna panel 98 and glass panel 100 could be press-fit together and glued to the base of the handheld device 96. The antenna element 94 is electrically coupled to communications circuitry contained in the handheld device 96 such that the glass encasing acts as an antenna.

In some embodiments, antenna elements integrated with an encasing of a handheld device are separated by concealed antenna breaks. As referred to here, a "concealed" antenna break is not visible on an exterior surface of an encasing. Instead, the encasing has a continuous exterior surface which masks antenna elements and antenna breaks on an interior of the encasing.

In some embodiments, an encasing integrated with antenna elements separated by concealed antenna breaks is formed of multiple layers. For example, the encasing may include a continuous layer of non-conductive material that forms the external surface of the encasing. The encasing may also include a contiguous layer of conductive material separated by non-conductive material, which is hidden by the external continuous layer of non-conductive material. In this embodiment, the conductive material separated by non-conductive material forms the antenna elements separated by antenna breaks.

FIG. 7A shows antenna elements separated by a concealed antenna break integrated with an encasing of a handheld device. The back of a handheld device 104 includes an encasing 106 with a continuous surface. The handheld device 104 includes appurtenances such as a backside camera 108, a light source 110, and a physical button 112. These appurtenances may be incorporated in the continuous surface of the encasing 106. The encasing 106 includes antenna elements separated by antenna breaks that are hidden from the outside of the handheld device 104. Thus, the encasing 106 appears uniform because it has a continuous exterior surface.

FIG. 7B is a functional representation of the antenna 114 formed by the encasing 106 of the handheld device 104 of FIG. 7A. An outer layer of the encasing 106 is RF transparent to an inner layer that includes antenna elements 116-1 and 116-2 separated by a concealed antenna break 118. As such, the enclosure of the handheld device 104 is an antenna having a continuous exterior surface.

Figure 7C:
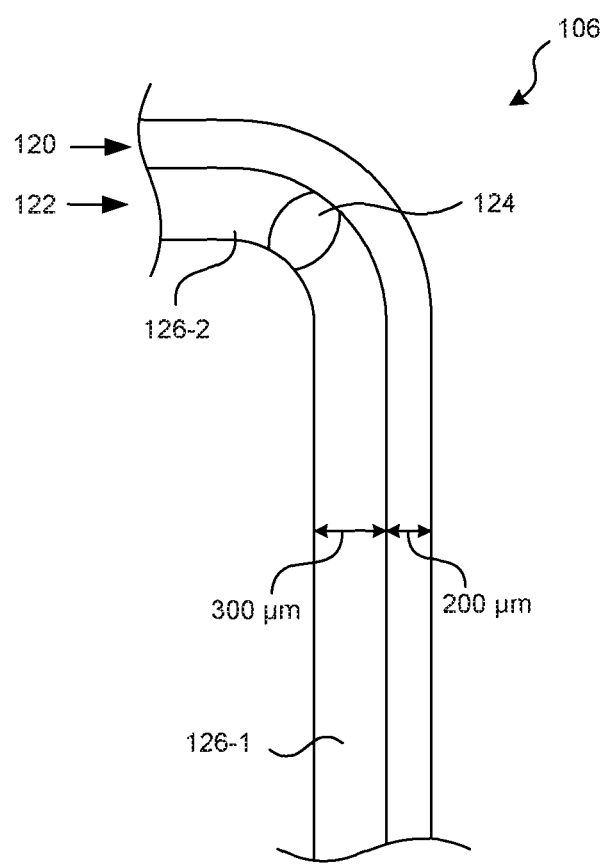
FIG. 7C is a cutaway profile view of a portion of the handheld device of FIG. 7A.

FIG. 7C is a cutaway profile view of a portion of the encasing 106 of the handheld device 104 of FIG. 7A. The encasing 106 is composed of multiple layers. An outermost continuous layer 120 of non-conductive material forms an exterior of the encasing 106. A contiguous layer 122 of conductive material separated by the non-conductive region 124 forms an interior of the encasing. Thus, the interior of the encasing 106 includes conductive regions 126-1 and 126-2 separated by the non-conductive region 124 corresponding to the antenna elements 116-1 and 116-2 separated by the antenna break 118, respectively.

The outermost continuous layer 120 has sufficient thickness and hardness to provide structural support to form the encasing 106 and subsequently enable RF transparency for the antenna elements 116-1 and 116-2 of the contiguous layer 122. For example, the contiguous layer 122 may be formed of a metal that is etched to create a gap (e.g., non-conductive region 124) that separates the metal into the regions 126-1 and 126-2. The gap could then be backfilled with non-conductive filler. In some embodiments, the non-conductive filler may include an adhesive that bonds the different regions of the contiguous layer 122 to the outermost continuous layer 120 to provide additional structural support for the encasing 106.

As detailed below, the outermost continuous layer 120 has sufficient thickness and hardness to remain structurally intact during the etching and backfilling processes, and then subsequently enabling RF transparency. In some embodiments, the outermost continuous layer 120 may have a thickness of about two-thirds the thickness of the contiguous layer 122. For example, FIG. 7C shows the outermost continuous layer 120 having a thickness of 200 micrometers and the contiguous surface 122 having a thickness of 300 micrometers. The conductive regions 126-1 and 126-2 are electrically coupled to communications circuitry of the handheld device 104 to form the antenna elements 116-1 and 116-2 of the antenna 114. As such, the encasing integrates antenna elements separated by a concealed antenna break.

Figure 8:
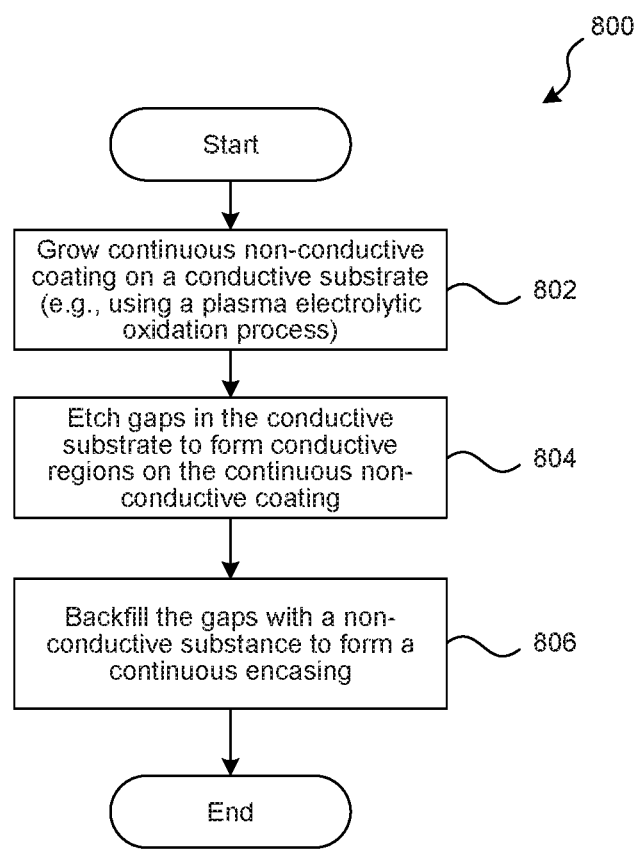
FIG. 8 illustrates a method of using electrochemical surface treatment processes to integrate antenna elements separated by concealed antenna breaks with an encasing for a handheld device.
Figure 9:
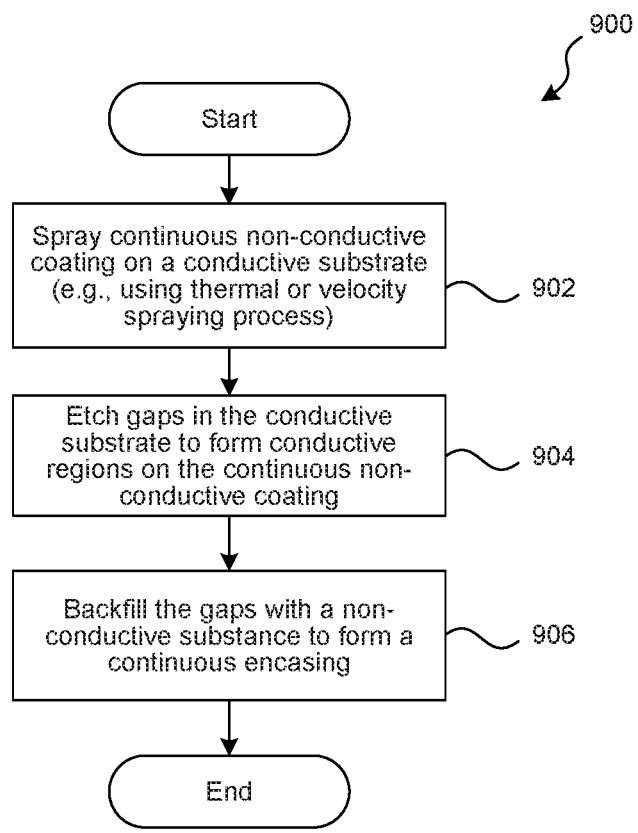
FIG. 9 illustrates a method of using a spraying process to integrate antenna elements separated by concealed antenna breaks with an encasing for a handheld device according to one embodiment.
Figure 10:
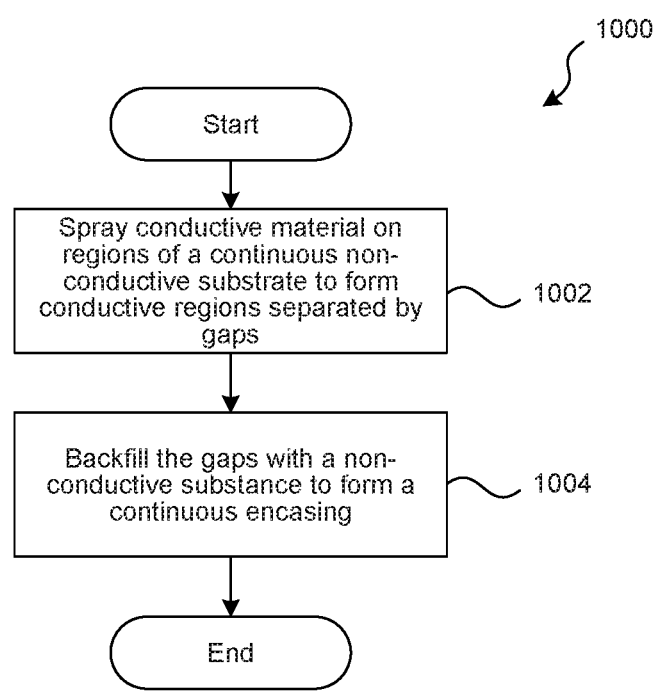
FIG. 10 illustrates a method of using a spraying process to integrate antenna elements separated by concealed antenna breaks with an encasing for a handheld device according to another embodiment.

FIGS. 8 through 10 illustrate methods of integrating antenna elements separated by concealed antenna breaks with an encasing of a handheld device. The disclosed methods include processes that form a combination of conductive and non-conductive regions as a single encasing structure. In some embodiments, the regions are formed of materials grown or sprayed on substrates, then etched and backfilled, or combinations thereof, to form the single encasing structure having a continuous exterior surface that is RF transparent to support antenna elements separated by a concealed antenna break integrated with the encasing structure.

FIG. 8 illustrates a method 800 of using electrochemical surface treatment processes to integrate antenna elements separated by concealed antenna breaks into an encasing for a handheld device. The method includes using an electrochemical surface treatment process to grow a non-conductive coat on a conductive substrate. The non-conductive coat has a continuous surface that forms an exterior surface of the encasing. The conductive substrate is etched and backfilled to form antenna elements separated by concealed antenna breaks incorporated into the encasing for the handheld device.

In step 802, a conductive substrate such as a metal layer undergoes a electrochemical surface treatment process to grow a continuous non-conductive coat. The electrochemical surface treatment process may include plasma electrolytic oxidation (PEO), which is also known as microarc oxidation (MAO). This process can grow an oxide coating on metals such as aluminum or titanium. The coating can provide electrical insulation and form a hard and continuous exterior surface on an encasing structure. The coating should be of sufficient thickness to enable etching and backfilling processes of the metal substrate to form antenna elements separated by concealed antenna breaks. For example, a coating on a 300-micrometer-thick metal substrate could be 200 micrometers or more.

In step 804, the conductive metal layer undergoes an etching process to form gaps that separate the metal layer into conductive regions on the continuous non-conductive layer. In step 806, the gaps are backfilled with a non-conductive filler that acts as an electrical insulator between the conductive regions. In some embodiments, the filler may include an adhesive that bonds the conductive regions and the non-conductive layer. As a result, the combination of conductive regions separated by non-conductive filler all on a continuous non-conductive substrate forms a single encasing structure that integrates antenna elements separated by concealed antenna breaks.

FIGS. 9 and 10 illustrate methods of using spraying processes to integrate antenna elements separated by concealed antenna breaks into an encasing for a handheld device. The spraying processes include thermal spraying and velocity spraying to produce a layer of material having sufficient thickness and hardness and with desired electrical properties. In thermal spraying, a coating is formed on a surface by spraying heated particles that adhere to the surface. In velocity spraying (e.g., gas dynamic cold spraying (GDCS)), a coating is formed on a surface by accelerating particles at supersonic speeds to impact the surface. During impact with the substrate, the particles undergo plastic deformation and adhere to the surface of the substrate.

Coating materials available for the spaying processes may include metals, alloys, ceramics, plastics, composites, and the like. In some embodiments, conductive material is sprayed on regions of a continuous conductive substrate to form separate conductive regions. In some embodiments, non-conductive material is sprayed on a conductive substrate to form a continuous non-conductive coating. The conductive substrate is then etched and backfilled to produce separate conductive regions. The resulting structure forms antenna elements separated by the concealed antenna break when electrically coupled to communications circuitry of a handheld device.

FIG. 9 illustrates a method 900 of using a spraying process to integrate antenna elements separated by concealed antenna breaks into an encasing for a handheld device according to another embodiment. In step 902, a non-conductive material is sprayed on a conductive substrate to form a continuous non-conductive coating that covers the conductive substrate. For example, a ceramic could be sprayed to cover an entire metal substrate. The ceramic would form a continuous surface of sufficient thickness and hardness to undergo an etching process of the metal substrate. In step 904, the conductive substrate undergoes an etching process to form gaps that separate conductive regions on the continuous non-conductive coating. In step 906, the gaps are backfilled with a non-conductive filler that acts as an electrical insulator between the conductive regions. In some embodiments, the filler may include an adhesive that bonds the conductive regions and the non-conductive substrate. As a result, the combination of conductive regions separated by non-conductive filler all on a continuous non-conductive substrate forms a single encasing structure that integrates antenna elements separated by concealed antenna breaks.

FIG. 10 illustrates a method 1000 of using a spraying process to integrate antenna elements separated by concealed antenna breaks into an encasing for a handheld device according to one embodiment. In step 1002, a conductive material is sprayed on regions of a continuous non-conductive substrate to form conductive regions on the continuous non-conductive substrate. The conductive regions are separated by gaps. In step 1004, the gaps are backfilled with a non-conductive filler that acts as an electrical insulator between the conductive regions. In some embodiments, the filler may include an adhesive that bonds the conductive regions and the non-conductive layer. As a result, the combination of conductive regions separated by non-conductive filler all on a continuous non-conductive substrate forms a single encasing structure that integrates antenna elements separated by concealed antenna breaks.

The disclosed methods of integrating antenna elements separated by concealed antenna breaks into an encasing for a handheld device are not limited to the examples shown in FIGS. 8 through 10. A person skilled in the relevant technologies would understand that the steps of the disclosed methods could be practiced in different orders. In some embodiments, the methods may omit certain steps or include steps known to persons skilled in the art but not described here for the sake of brevity. For example, in some embodiments, non-conductive coating technology could be utilized to conceal antenna breaks.

While the disclosure has been described in terms of several embodiments, those skilled in the art will recognize that the disclosure is not limited to the embodiments described herein, and can be practiced with modifications and alterations within the spirit and scope of the invention. Those skilled in the art will also recognize improvements to the embodiments of the present disclosure. All such improvements are considered within the scope of the concepts disclosed herein and the embodiments that follow. Thus, the description is to be regarded as illustrative instead of limiting.

The invention claimed is:
1. A handheld device, comprising:
an encasing including electrically conductive material;

one or more appurtenances including any of a touch-sensitive display screen, a button, a joystick, a click wheel, a scroll wheel, a touchpad, a keypad, a camera, a data port, or a power port forming part of the encasing, the one or more appurtenances including electrically conductive material;
communications circuitry contained within the encasing and operable to process communications signals; and
a plurality of antenna elements electrically coupled to the communications circuitry and formed of (a) the electrically conductive material of the encasing and (b) the electrically conductive material of the one or more appurtenances such that the encasing and the one or more appurtenances are separated by a non-conductive irregularly shaped antenna break and are operable as an antenna of the handheld device to wirelessly communicate radio signals capable of being processed by the communications circuitry.

2. The handheld device of claim 1, wherein the irregularly shaped antenna break is non-linear along a single plane.

3. The handheld device of claim 1, wherein the irregularly shaped antenna break has a variable width.

4. The handheld device of claim 1, wherein the irregularly shaped antenna break separates at least one of the plurality of antenna elements integrated with the encasing and at least one of the plurality of antenna elements integrated with at least one of the one or more appurtenances.

5. The handheld device of claim 4, wherein the at least one of the one or more appurtenances comprises a camera including a bezel and a lens, the bezel holding the lens to the encasing.

6. The handheld device of claim 5, wherein the bezel comprises the at least one of the plurality of antenna elements integrated with the camera.

7. The handheld device of claim 6, wherein the irregularly shaped antenna break surrounds the bezel to separate the at least one of the plurality of antenna elements integrated with the camera and the at least one of the plurality of antenna elements integrated with the encasing.

8. The handheld device of claim 1, wherein at least some of the plurality of antenna elements integrated with the encasing are separated by at least one concealed antenna break.

9. The handheld device of claim 8, wherein the encasing comprises:
a continuous layer of non-conductive material, the continuous layer forming an exterior surface of the encasing; and
a contiguous layer of conductive regions separated by at least one non-conductive region, the contiguous layer forming an interior surface of the encasing, and the conductive regions correspond to the at least some of the plurality of antenna elements and the at least one non-conductive region corresponds to the at least one concealed antenna break.

10. The handheld device of claim 1, wherein the one or more appurtenances comprises a touch-sensitive display screen including driving lines and sensing lines to receive touch input, and at least some of the plurality of antenna elements are integrated with at least one of the driving lines or sensing lines.

11. The handheld device of claim 1, wherein the one or more appurtenances comprises a display screen including a plurality of conductive elements configured to enable rendering images on the display screen, and at least some of the plurality of antenna elements correspond to the plurality of conductive elements configured to enable rendering images on the display screen.

12. The handheld device of claim 1, wherein at least some of the plurality of antenna elements are automatically disabled while other antenna elements of the plurality of antenna elements are enabled.

* * * * *